United States Patent
Kim (10) Patent No.: US 12,472,789 B2
(45) Date of Patent: Nov. 18, 2025

(54) HYDRAULIC STOPPING DAMPER

(71) Applicant: HL MANDO CORPORATION, Pyeongtaek-si (KR)

(72) Inventor: Eun Joong Kim, Hwaseong-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 603 days.

(21) Appl. No.: 17/881,509

(22) Filed: Aug. 4, 2022

(65) Prior Publication Data

US 2023/0039371 A1    Feb. 9, 2023

(30) Foreign Application Priority Data

Aug. 5, 2021   (KR) .................. 10-2021-0103097

(51) Int. Cl.
*B60G 15/06* (2006.01)
*F16F 13/00* (2006.01)

(52) U.S. Cl.
CPC .......... *B60G 15/061* (2013.01); *F16F 13/007* (2013.01); *B60G 2202/30* (2013.01); *B60G 2204/4502* (2013.01); *B60G 2800/162* (2013.01); *F16F 2230/007* (2013.01)

(58) Field of Classification Search
CPC .............. B60G 15/061; B60G 2202/30; B60G 2204/4502; B60G 2800/162; F16F 13/007; F16F 2230/007; F16F 9/58
See application file for complete search history.

(56) References Cited

U.S. PATENT DOCUMENTS

| | | | | |
|---|---|---|---|---|
| 7,032,727 | B2 * | 4/2006 | Vanspauwen | F16F 9/49 267/221 |
| 8,127,901 | B1 * | 3/2012 | Lu | F16F 9/585 188/282.5 |
| 2011/0101585 | A1 * | 5/2011 | Kamae | F16F 9/3242 267/226 |
| 2023/0108889 | A1 * | 4/2023 | Lun | B60G 13/00 267/220 |

OTHER PUBLICATIONS

Japanese Patent No. JP H0612848 published on Feb. 18, 1994.*
Japanese Patent No. JP 2006138367 to Ota published on Jun. 1, 2006.*
Korean Patent No. KR 20110047974 published on May 9, 2011.*

* cited by examiner

*Primary Examiner* — Pamela Rodriguez
(74) *Attorney, Agent, or Firm* — Hauptman Ham, LLP (57) ABSTRACT

Present disclosure A hydraulic stopping damper includes a cylinder in which a work fluid is stored, a piston rod coupled such that one side of the piston rod is to be inserted into an inner space of the cylinder, and a rod guide through which the piston rod passes and coupled to one side of the cylinder. The hydraulic stopping damper includes a rebound spring surrounding the piston rod and disposed in an inner space of the cylinder, and a shock mitigator between the rod guide and the rebound spring, the shock mitigator configured to generate a damping force by a hydraulic pressure of the work fluid when one side of the rebound spring compressed in response to a rebound stroke of the piston rod is inserted into the rod guide.

16 Claims, 10 Drawing Sheets

HYDRAULIC STOPPING DAMPER

CROSS-REFERENCE TO RELATED APPLICATION

This application claims priority under 35 U.S.C. § 119 to Korean Patent Application No. 10-2021-0103097, filed on Aug. 5, 2021, in the Korean Intellectual Property Office (KIPO), the disclosure of which is incorporated by reference herein in its entirety.

TECHNICAL FIELD

Embodiments of the present disclosure relate to a hydraulic stopping damper, and more particularly, to a hydraulic stopping damper capable of substantially preventing noise generated due to collision of a rebound spring when a vehicle passes through bumps and irregularities.

DISCUSSION OF RELATED ART

In general, opposite ends of a shock absorber for vehicles are secured to a vehicle body and a wheel. The shock absorber for vehicles may quickly absorb various vibrations or shocks transmitted from the wheel in contact with the road surface during driving so as to prevent these vibrations from being transmitted to the vehicle body, thereby improving riding comfort and driving stability.

Such a shock absorber acquires required damping force characteristics by moving a work fluid up and down when a piston rod performs compression and rebound strokes up and down.

In such a case, the piston rod is provided with a rebound spring, and extension of the piston rod toward an upper side is controlled by using a damping force by the rebound spring. Accordingly, roll characteristics when the vehicle turns may be effectively controlled and optimum riding comfort may be secured when driving on a general road.

There is a trend that a spring constant of the rebound spring continuously increases in order to increase the roll control performance. As the spring constant increases, the frequency of contact noise that may be generated by contact between the rebound spring and the rod guide during the rebound stroke after compression, when passing through bumps and irregularities, is increasing.

It has been prevented through vehicle evaluation during the development process, but it is not easy to completely prevent the contact noise because conditions such as frequency and speed are different depending on the condition of the vehicle (speed and weight), the condition of bumps and irregularities, and the damping force.

In particular, if noise is detected after mass production is confirmed, it is necessary to give up the roll control performance of the vehicle and reduce a length of the rebound spring to improve the noise. However, since this is only to adjust the time when noise is generated, it does not fundamentally prevent noise, so noise may be generated under different road surface conditions, speed, and vehicle weight.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present disclosure may be directed to a hydraulic stopping damper capable of preventing noise due to collision of a rebound spring when a vehicle passes through bumps and irregularities.

According to an embodiment, a hydraulic stopping damper includes: cylinder in which a work fluid is stored; a piston rod coupled such that one side of the piston rod is to be inserted into an inner space of the cylinder; a rod guide through which the piston rod passes and coupled to one side of the cylinder; a rebound spring surrounding the piston rod and disposed in an inner space of the cylinder; and a shock mitigator between the rod guide and the rebound spring, the shock mitigator configured to generate a damping force by a hydraulic pressure of the work fluid when one side of the rebound spring compressed in response to a rebound stroke of the piston rod is inserted into the rod guide.

In some embodiments, the shock mitigator may include: a chamber formed between the shock mitigator and the rod guide; and a first spring guide coupled to one side of the rebound spring and including an upper side inserted into the chamber during the rebound stroke of the piston rod.

In some embodiments, the rod guide may include: a body portion inserted into the cylinder; and a first locking portion extending from an upper surface of the body portion and caught by the cylinder such that the body portion is not inserted past a predetermined length.

In some embodiments, the chamber may be formed in a recess shape concaved by a predetermined depth in a direction from a lower surface of the body portion toward an upper surface of the first locking portion.

In some embodiments, the first spring guide may include: an insertion portion inserted into the rebound spring; and a second locking portion extending from an upper surface of the insertion portion, formed to have an outer diameter larger than an outer diameter of the insertion portion, and caught by one side of the rebound spring, wherein the second locking portion is inserted into the chamber.

In some embodiments, an outer diameter of the second locking portion may be smaller than an inner diameter of the chamber such that a space is formed between an outer peripheral surface of the second locking portion and an inner peripheral surface of the chamber when the second locking portion is inserted into the chamber.

In some embodiments, the chamber may include: a first recess formed concavely by a predetermined depth in a direction from a lower surface of the body portion toward an upper surface of the first locking portion; and a second recess formed concavely by a predetermined depth in a direction from the first recess toward the upper surface of the first locking portion.

In some embodiments, a width of a first space when the second locking portion is inserted into the first recess may be larger than a width of a second space when the second locking portion is inserted into the second recess.

In some embodiments, an inner surface of the chamber may be tapered gradually decreasing from a lower side of the chamber to an upper side of the chamber to guide insertion of the second locking portion.

In some embodiments, as the second locking portion is inserted into the chamber, a hydraulic pressure formed in a space between the second locking portion and the chamber may gradually increase.

In some embodiments, an outer peripheral surface of the second locking portion may be tapered such that an outer diameter of the second locking portion gradually increases from the upper side to the lower side.

In some embodiments, as the second locking portion is inserted into the chamber, a hydraulic pressure formed in a space between the second locking portion and the chamber may gradually decrease.

In some embodiments, the shock mitigator may include: a retainer provided on the piston rod to be located in an inner space of the cylinder and connected to a lower portion of the rod guide, wherein the chamber is formed below the retainer; and a first spring guide coupled to one side of the rebound spring and inserted into the chamber during a rebound stroke of the piston rod.

In some embodiments, the retainer may include: a body having a cylindrical shape having a hollow through which the piston rod passes, wherein the chamber is formed in a recess shape concaved by a predetermined depth from a lower surface of the body toward an upper surface of the body.

In some embodiments, the first spring guide may include: an insertion portion inserted into the rebound spring; and a locking portion extending from an upper surface of the insertion portion and formed having an outer diameter larger than an outer diameter of the insertion portion to be caught by one side of the rebound spring, and the locking portion may be inserted into the chamber.

In some embodiments, an outer diameter of the locking portion may be formed smaller than an inner diameter of the chamber such that a space is formed between an outer peripheral surface of the locking portion and an inner peripheral surface of the chamber when the locking portion is inserted into the chamber.

In some embodiments, an inner surface of the chamber may be tapered gradually decreasing from a lower side of the chamber to an upper side of the chamber to guide insertion of the locking portion.

In some embodiments, as the locking portion is inserted into the chamber, a hydraulic pressure formed in a space between the locking portion and the chamber may gradually increase.

In some embodiments, an outer peripheral surface of the locking portion may be tapered such that an outer diameter of the locking portion gradually increases from the upper side to the lower side.

In some embodiments, as the locking portion is inserted into the chamber, a hydraulic pressure formed in a space between the locking portion and the chamber may gradually decrease.

The hydraulic stopping damper according to the present disclosure has the following effects.

First, as the shock mitigator generates a damping force, the rebound spring may absorb noise generated when the rebound spring collides with the rod guide, thereby preventing noise generation.

Second, a magnitude of the damping force may be adjusted by adjusting a width of a space between the chamber and the first spring guide which generates the damping force, and the magnitude of the damping force may be adjusted in response to a spring constant of the rebound spring.

In particular, as a width of the space increases, noise generation may be prevented only when a large amount of shock at high speed is applied, while serving the original function of the rebound spring, and as a width of the space decreases, generation of noise may be substantially prevented even with a small impact.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation according to an embodiment will become more apparent by describing in detail embodiments thereof with reference to the accompanying drawings, wherein:

FIGS. 4 to 9 are cross-sectional views illustrating other embodiments of a shock mitigator.

DETAILED DESCRIPTION

Hereinafter, with reference to the accompanying drawings, embodiments of the present disclosure will be described in detail so that those of ordinary skill in the art to which the present disclosure pertains would easily implement them. The present disclosure may be embodied in many different forms and is not limited to the embodiments described herein.

It is noted that the drawings are schematic and not drawn to scale. Relative dimensions and proportions of parts in the drawings are illustrated exaggerated or reduced in size for clarity and convenience in the drawings, and any dimensions are illustrative only and not limiting. The same reference numerals are used to indicate like features to the same structural element or part in two or more drawings.

The embodiment of the present disclosure specifically represents an ideal embodiment of the present disclosure. As a result, various modifications of the drawings are expected. Accordingly, the embodiment is not limited to a specific shape of the illustrated area, and includes, for example, a shape modification by manufacturing.

Hereinafter, a hydraulic stopping damper according to the present disclosure will be described with reference to FIGS. 1 to 9.

Figure 1:
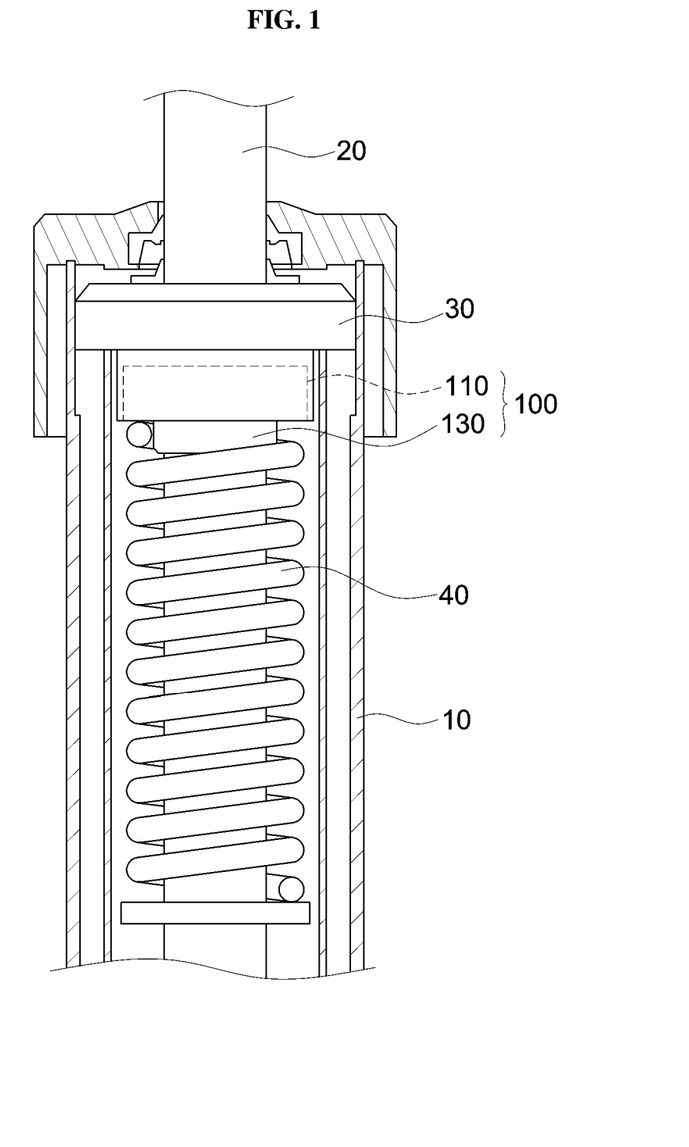
FIG. 1 is a cross-sectional view illustrating a part of a structure of a hydraulic stopping damper according to an embodiment of the present disclosure.

The hydraulic stopping damper includes a cylinder 10, a piston rod 20, a rod guide 30, a rebound spring 40, and a shock mitigator 100.

The cylinder 10 stores (e.g., accommodates) a work fluid. The cylinder 10 is formed in a cylindrical shape having an inner space such that a work fluid may be stored therein.

The piston rod 20 is coupled such that one side is inserted into the inner space of the cylinder 10. Specifically, one side of the piston rod 20 is inserted into the inner space of the cylinder 10, and another side of the piston rod 20 is coupled to the cylinder 10 so as to protrude outside the cylinder 10.

A piston valve (not illustrated) is mounted at one end portion of the piston rod 20 inserted into the inner space of the cylinder 10. The inner space of the cylinder 10 may be divided into a rebound chamber and a compression chamber by the piston valve (not illustrated).

The rod guide 30 allows the piston rod 20 to pass therethrough, and is coupled to one side of the cylinder 10 to shield one side of the cylinder 10. The rod guide 30 has a through hole 32 defined therethrough in a longitudinal direction such that the piston rod 20 may pass therethrough. A chamber 110 of the shock mitigator 100 is formed between the shock mitigator 100 and the rod guide 30. Specifically, the chamber 110 is formed below the rod guide 30. The shape of the rod guide 30 and the chamber 110 will be described in more detail below.

The rebound spring 40 surrounds the piston rod 20 and is located in the inner space of the cylinder 10. When a vehicle passes through bumps and irregularities, the piston rod 20 makes a rebound stroke. In such a case, the rebound spring 40 generates a damping force while being compressed to exhibit roll control performance.

Meanwhile, a spring constant of the rebound spring 40 is continuously increased in order to increase the roll control performance. The rebound spring 40 is compressed during the rebound stroke of the piston rod 20 and collides with the rod guide 30 to generate noise. However, as the spring constant of the rebound spring 40 increases, there is a problem in that the frequency of noise generation increases.

The hydraulic stopping damper of the present disclosure includes the shock mitigator 100 in order to prevent noise generation due to the collision between the rebound spring 40 and the rod guide 30 as described above.

The shock mitigator 100 is provided between the rod guide 30 and the rebound spring 40. The shock mitigator 100 is to prevent noise by generating a damping force by using a hydraulic pressure when one side of the rebound spring 40 collides with the rod guide 30 as the rebound spring 40 is compressed during the rebound stroke of the piston rod 20.

The shock mitigator 100 includes the chamber 110 and a first spring guide 130.

As described above, the chamber 110 is formed below the rod guide 30. In order to describe the chamber 110, a shape of the rod guide 30 will be firstly described in detail.

Figure 2:
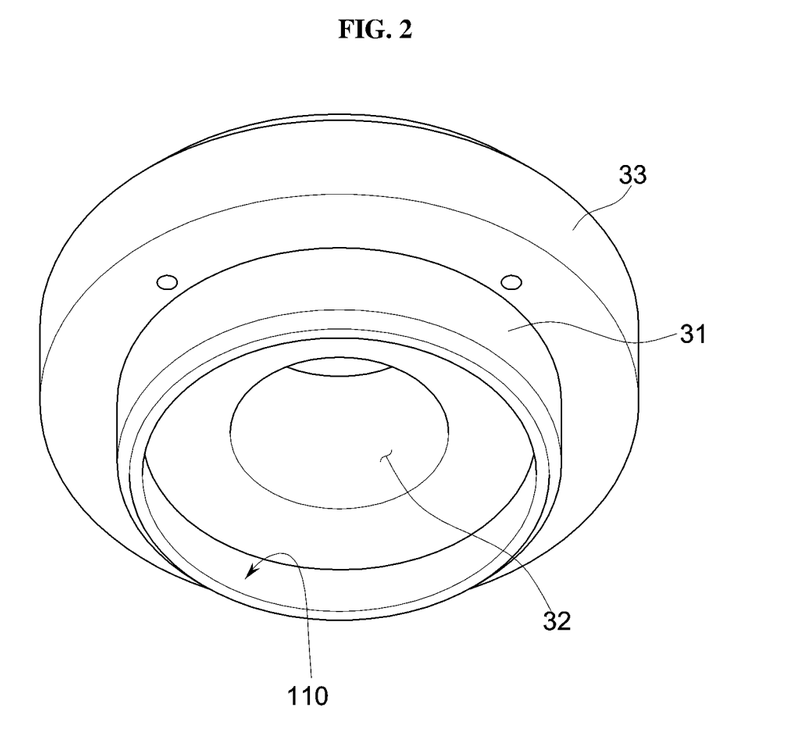
FIG. 2 is a perspective view illustrating a structure of a shock mitigator of the hydraulic stopping damper of FIG. 1.

Referring to FIG. 2, the rod guide 30 includes a body portion 31 and a first locking portion 33. The body portion 31 is formed in the form of a column having a circular cross-section in a direction crossing a longitudinal direction. The body portion 31 is inserted into the cylinder 10.

The first locking portion 33 is formed extending from an upper surface of the body portion 31. Similar to the body portion 31, the first locking portion 33 is also formed in the form of a column having a circular cross-section in a direction crossing a longitudinal direction. In an embodiment, a cross-sectional size of the first locking portion 33 is formed to be larger than a cross-sectional size of the body portion 31, such that the body portion 31 is caught by the cylinder 10 such that the body portion 31 is not inserted past a predetermined length.

As described above, the through hole 32 formed such that the piston rod 20 passes through the rod guide 30 is defined through both of the body portion 31 and the first locking portion 33.

The chamber 110 is formed on a lower surface of the body portion 31. Specifically, it is formed in the form of a recess concaved by a predetermined depth in a direction from the lower surface of the body portion 31 toward an upper surface of the first locking portion 33.

The first spring guide 130 includes an insertion portion 131 and a second locking portion 133. The insertion portion 131 is inserted into the rebound spring 40. Accordingly, the insertion portion 131 is formed in the form of a column having a circular cross-section in a direction crossing the longitudinal direction.

The second locking portion 133 is formed extending along the longitudinal direction from the upper surface of the insertion portion 131. The second locking portion 133, similar to the insertion portion 131, also has a circular cross-section in a direction crossing the longitudinal direction. The second locking portion 133 is formed having an outer diameter larger than an outer diameter of the insertion portion 131, such that when the insertion portion 131 is inserted into the rebound spring 40, it may be caught by one side of the rebound spring 40.

A size of the outer diameter of the second locking portion 133 is smaller than a size of the inner diameter of the chamber 110.

The shock mitigator 100 as described above is provided such that shock that may be generated as the first spring guide 130 is inserted into the rod guide 30 when the piston rod 20 performs the rebound stroke may be relieved and noise generation may be prevented.

Specifically, as the second locking portion 133 of the first spring guide 130 is inserted into the chamber 110, a damping force is generated by a hydraulic pressure filled in the space between the second locking portion 133 and the chamber 110.

Figure 3:
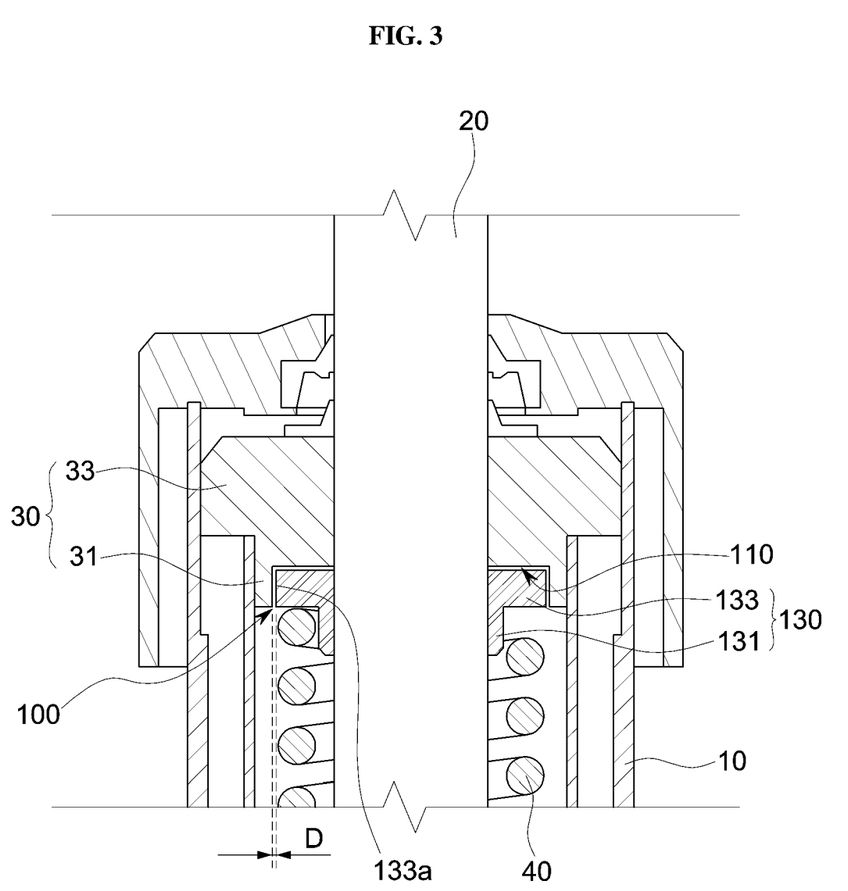
FIG. 3 is a cross-sectional view illustrating a rod guide of the hydraulic stopping damper of FIG. 1.

As described above, since the outer diameter of the second locking portion 133 is formed to be smaller than the inner diameter of the chamber 110, when the second locking portion 133 is inserted into the chamber 110, a space D is formed between an outer peripheral surface 133a of the second locking portion 133 and an inner peripheral surface 111 of the chamber 110 (See FIG. 3).

The work fluid filled in the chamber 110 flows into an inner space of the cylinder 10 through the space D when the second locking portion 133 is inserted into the chamber 110. That is, when the work fluid flows from the space D to the inner space of the cylinder 10, a pressure of the fluid increases due to the orifice effect, thereby generating a damping force.

At the same time, noise that may be generated due to a shock as the second locking portion 133 is inserted into the chamber 110 may be absorbed by the damping force. That is, the shock noise that may be generated while the rebound spring 40 is compressed may be substantially prevented.

Figure 4:
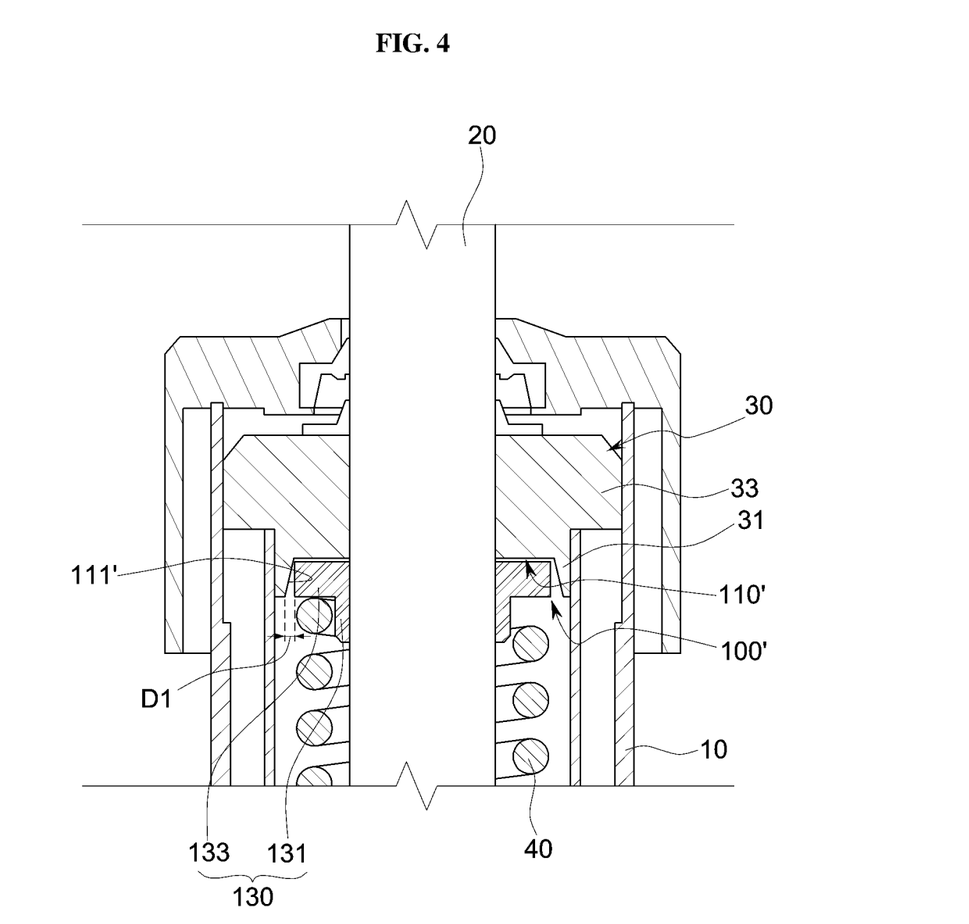

In addition, the shock mitigator 100' may be implemented into another embodiment as illustrated in FIG. 4.

A shock mitigator 100' in an embodiment illustrated in FIG. 4 is different from the above-described embodiment in terms of a shape of the chamber 110'. In the above-described embodiment, the size of the inner peripheral surface of the chamber 110 is uniformly formed from the lower surface of the body portion 31 to the upper surface of the first locking portion 33. However, in the present embodiment, the size of the inner peripheral surface of the chamber 110' is not uniformly formed from the lower surface of the body portion 31 to the upper surface of the first locking portion 33.

When the second locking portion 130 is inserted into the chamber 110', the chamber 110' may guide insertion of the second locking portion 130. Accordingly, the inner diameter of the chamber 110' may be formed to decrease gradually from the lower side of the body portion 31 to the upper side of the body portion 31. That is, the inner surface 111' of the chamber 110' is tapered.

As such, if the inner surface 111' of the chamber 110' is tapered, a length of a width of the space D1 when the second locking portion 130 is inserted into the chamber 110' is also gradually decreased from the lower side of the body portion 31 toward the upper side of the body portion 31. Accordingly, a magnitude of the damping force generated through the space D1 is also gradually changed. Specifically, since the hydraulic pressure formed in the space D1 between the second locking portion 133 and the chamber 110' is gradually increased as the second locking portion 133 is inserted from the lower side of the chamber 110' to the upper side of the chamber 110', the damping force generated in the space D1 also varies to increase gradually.

Figure 5:
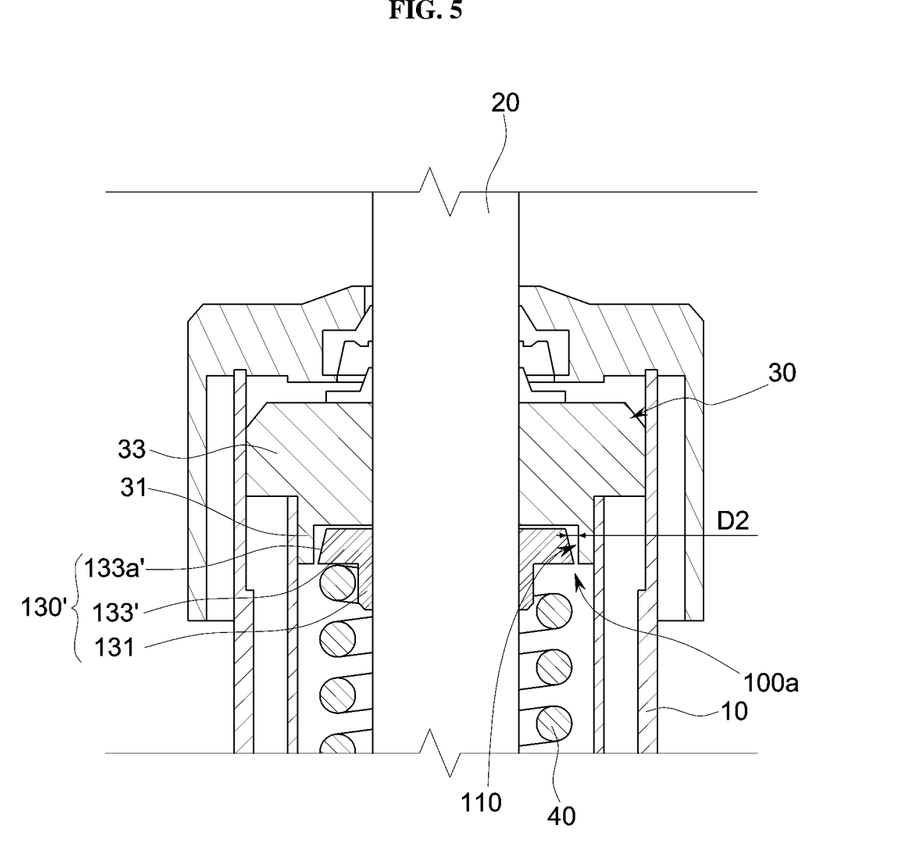

An embodiment illustrated in FIG. 5 is contrary to the embodiment illustrated in FIG. 4.

A shock mitigator 100a illustrated in FIG. 5 is also formed differently from the above-described embodiments in terms of a shape of the first spring guide 130' considering that the first spring guide 130' is guided when the first spring guide 130' is inserted into the chamber 110.

In the embodiment illustrated in FIG. 4, the chamber 110' serves guiding, but in the present embodiment, a second locking portion 133' serves guiding. Specifically, as illustrated in FIG. 5, an outer diameter of the second locking portion 133' gradually increases from an upper side to a lower side. To this end, an outer peripheral surface 133a' of the second locking portion 133' is tapered.

For this reason, a width of a space D2 between the second locking portion 133' and the chamber 110 is gradually narrowed from the upper side of the second locking portion 133' to the lower side of the second locking portion 133'. Accordingly, a hydraulic pressure formed in the space D2 between the second locking portion 133' and the chamber 110 is gradually reduced, and the damping force generated in the space D2 also varies to be decreased as the second locking portion 133' is inserted from the lower side of the chamber 110 to the upper side of the chamber 110.

In such a case, the rebound spring 40 serves the original function, but only when a large amount of shock at a high speed is added to the vehicle, the shock mitigator 100a may generate a damping force.

Figure 6A:
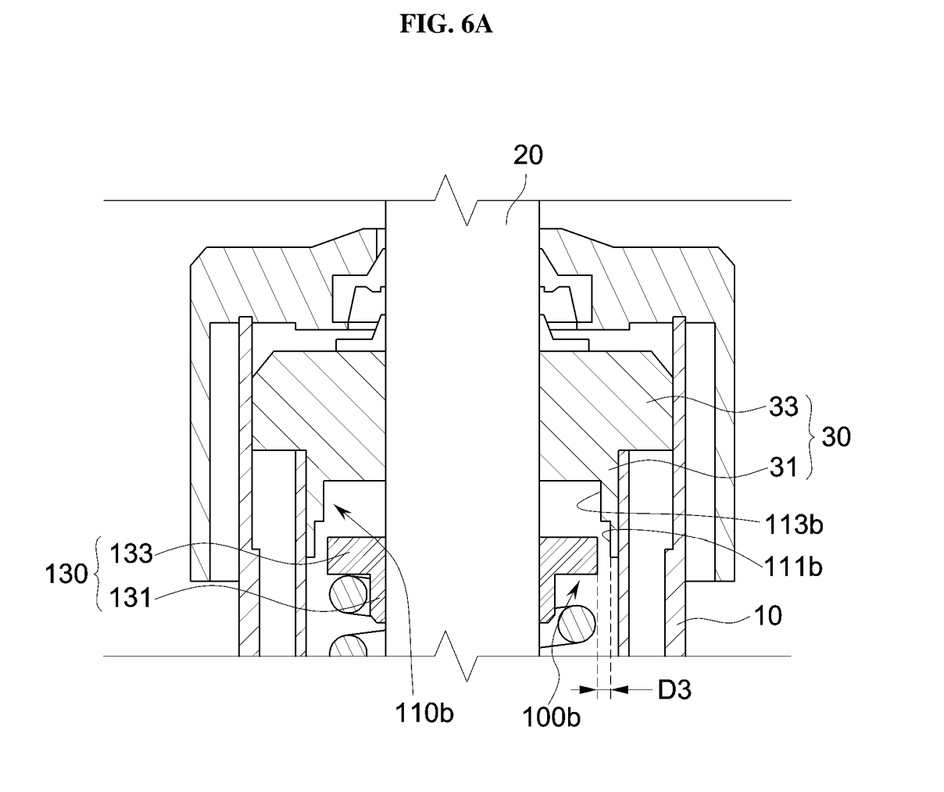
Figure 6B:
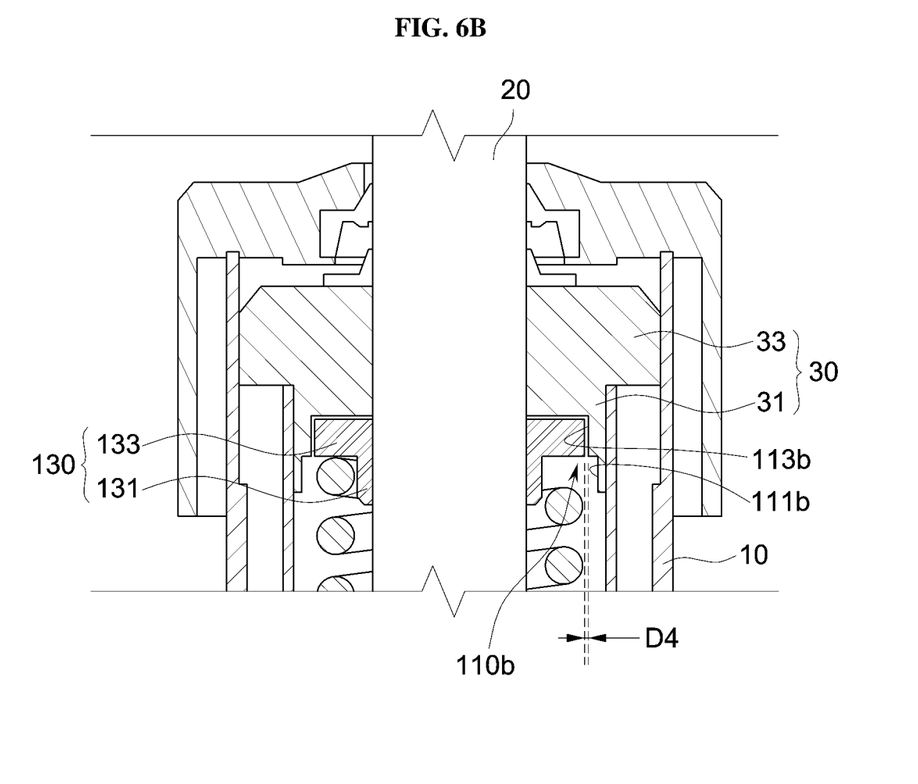

FIGS. 6A and 6B illustrate another embodiment of the shock mitigator 100b.

An embodiment illustrated in FIGS. 6A and 6B are modified from an embodiment illustrated in FIG. 3 in that a chamber 110b has a different shape. As illustrated in FIGS. 6A and 6B, the chamber 110b includes a first recess 111b concaved by a predetermined depth in a direction from the lower surface of the body portion 31 toward the upper surface of the first locking portion 33, and a second recess 113b concaved by a predetermined depth in a direction from the first recess 111b toward the upper surface of the first locking portion 33.

Referring to FIGS. 6A and 6B, a size of an inner diameter of the first recess 111b is larger than a size of an inner diameter of the second recess 113b. Accordingly, a width of a first space D3 when the second locking portion 133 of the first spring guide 130 is inserted into the first recess 111b of the chamber 110b is different from a width of a second space D4 when the first spring guide 130 is inserted into the second recess 113b of the chamber 110b.

In the present embodiment, the width of the first space D3 is formed to be larger than the width of the second space D4. Accordingly, a magnitude of a damping force generated when the first spring guide 130 is inserted into the first recess 111b is different from a magnitude of a damping force generated when the first spring guide 130 is inserted into the second recess 113b.

That is, when the shock mitigator 100b according to the embodiment illustrated in FIGS. 6A and 6B are applied, when the rebound spring 40 is compressed due to the rebound stroke of the piston rod 20, the damping force generated between the first spring guide 130 and the chambers 110b may be adjusted in stages.

In the case of an embodiment illustrated in FIGS. 6A and 6B, the damping force is greater when the second locking portion 133 is inserted into the second recess 113b than a damping force generated when the second locking portion 133 is inserted into the first recess 111b.

In addition, when a depth of the first recess 111b and a depth of the second recess 113b are adjusted, a timing at which the damping force is generated between the first spring guide 130 and the chamber 110b may be adjusted. That is, the timing when the damping force changes from the first recess 111b to the second recess 113b may be adjusted through the depth of the first recess 111b and the depth of the second recess 113b.

Figure 7:
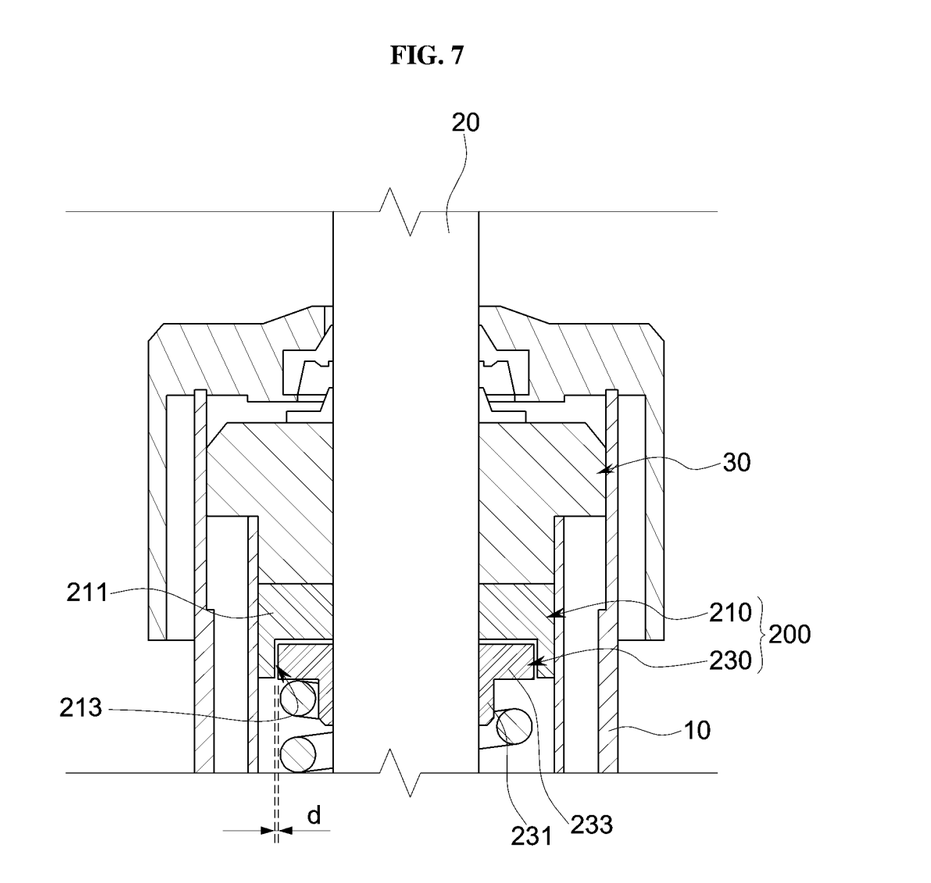
Figure 8:
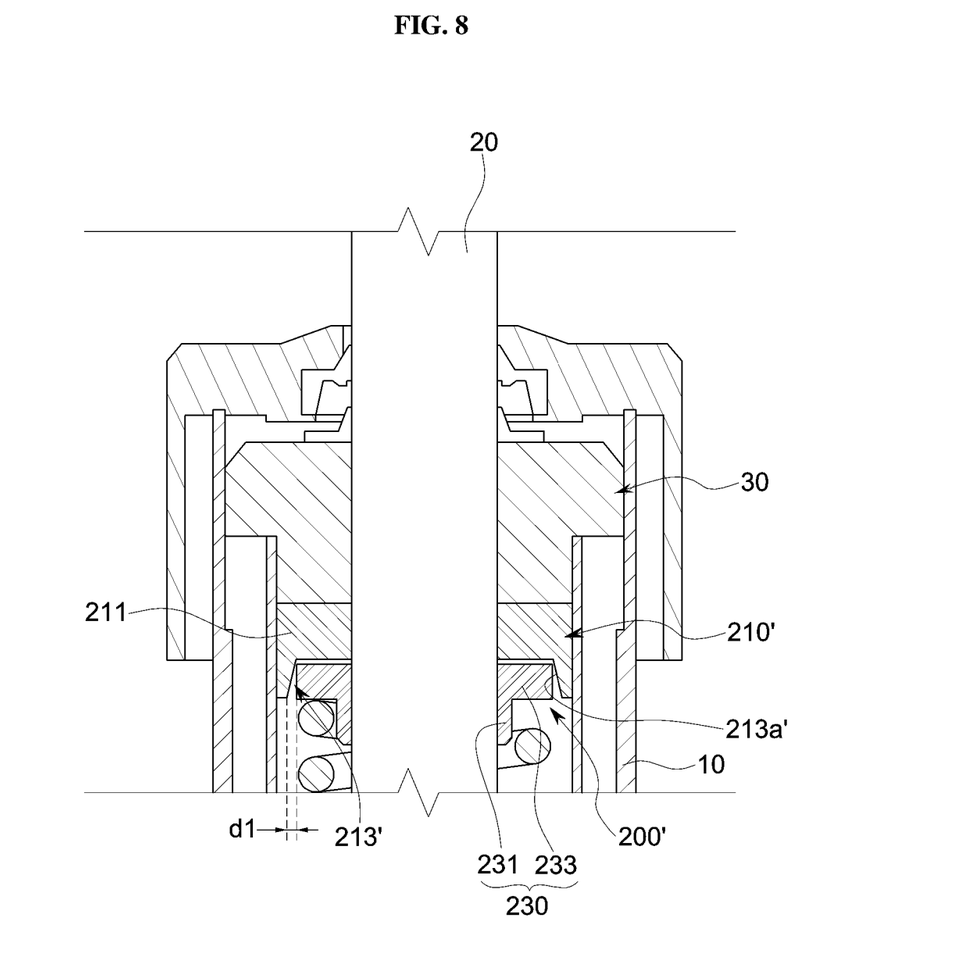
Figure 9:
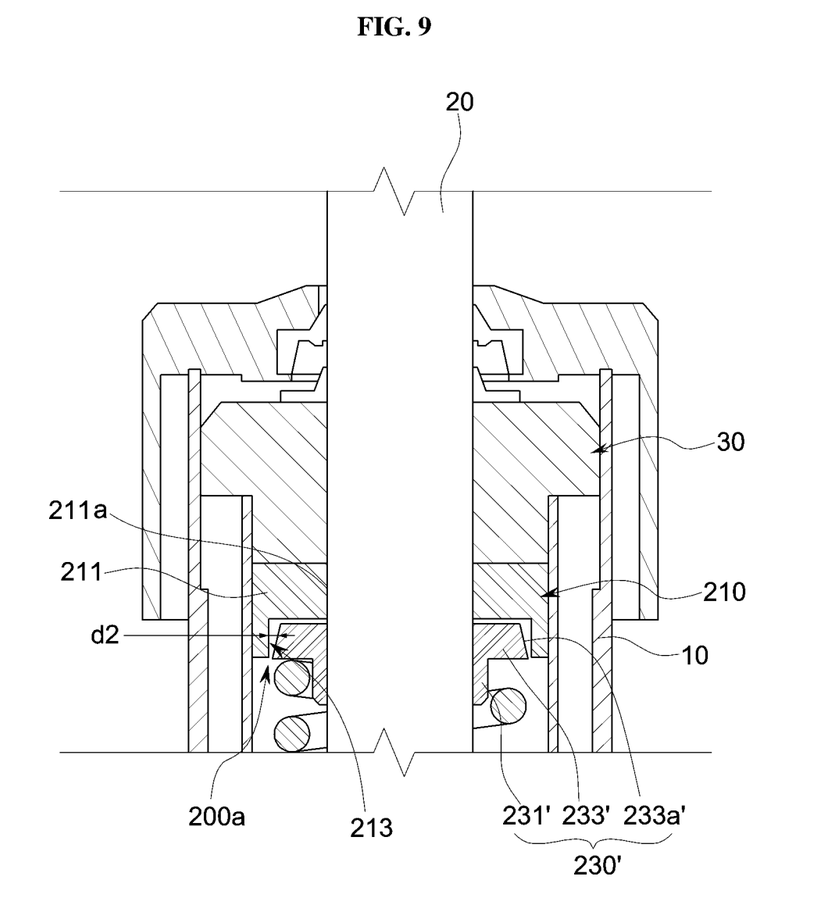

FIGS. 7 to 9 are views illustrating a shock mitigator according to another embodiment of the present disclosure.

First, referring to FIG. 7, a shock mitigator 200 includes a retainer 210 and a first spring guide 230.

The retainer 210 is coupled on the piston rod 20 so as to be located in the inner space of the cylinder 10 and is connected to the rod guide 30, and a chamber 213 is formed there below. Specifically, the retainer 210 is provided below the rod guide 30.

In embodiments illustrated in FIGS. 1 to 6, the chamber is formed in the rod guide 30, but in the present embodiment, the retainer 210 in which the chamber 213 is formed is provided separately. A shape of the retainer 210 will be describe in detail as follows.

The retainer 210 includes a body 211. The body 211 is formed in a cylindrical shape in which a first hollow (not illustrated) is formed along a longitudinal direction such that the piston rod 30 passes therethrough. The chamber 213 is formed in the form of a recess concaved by a predetermined depth in a direction from a lower surface of the body 211 toward an upper surface of the body 211.

The first spring guide 230 is substantially the same as the first spring guide 130 according to the above-described embodiment. The first spring guide 230 is coupled to one side of the rebound spring 40 and is inserted into the chamber 213 during the rebound stroke of the piston rod 30.

The first spring guide 230 includes an insertion portion 231 inserted into the rebound spring 40, and a locking portion 233 extending from an upper surface of the insertion portion 231.

The insertion portion 231 is formed in the form of a column having a circular cross-section in a direction crossing a longitudinal direction thereof. The locking portion 233 is formed extending from the upper surface of the insertion portion 231 as described above, and a cross-sectional size crossing the longitudinal direction is larger than a cross-sectional size of the insertion portion 233.

The locking portion 233 is caught by one side of the rebound spring 40 to prevent the insertion portion 231 from being inserted into the rebound spring 40 beyond a depth of the insertion portion 231.

A second hollow (not illustrated) is defined through the first spring guide 230 along the longitudinal direction through, and the piston rod 20 is coupled through the first spring guide 230.

In the shock mitigator 200 according to the present embodiment, the first spring guide 230 is inserted into the retainer 210 during the rebound stroke of the piston rod 20. Specifically, the locking portion 233 is inserted into the chamber 213.

Since an outer diameter of the locking portion 233 is smaller than an inner diameter of the chamber 213, a space d is formed when the locking portion 233 is inserted into the chamber 213. Accordingly, the work fluid filled in the chamber 213 flows into an inner space of the cylinder 10 through the space d, thereby generating a damping force, as the locking portion 233 is inserted into the chamber 213.

The damping force generated in such a way may absorb the noise from the shock that may be generated as the first spring guide 230 is inserted into the retainer 210, thereby preventing noise generation.

An embodiment illustrated in FIG. 8 is different from an embodiment illustrated in FIG. 4 in terms of a shape of a chamber 213'.

In an embodiment illustrated in FIG. 8, a size of an inner diameter of the chamber 213' gradually decreases from a lower surface of the retainer 210' toward an upper surface of the retainer 210'. That is, an inner peripheral surface 213a' of a chamber 213' is tapered.

Accordingly, when the first spring guide 230 is inserted into the chamber 213', a width of a space d1 between the locking portion 233 and the chamber 213' gradually decreases from a lower side of the retainer 210' toward an upper side of the retainer 210'. Accordingly, as the first spring guide 230 begins to be inserted into the chamber 213', a hydraulic pressure formed in the space d1 between the locking portion 233 and the chamber 213' gradually increases, and the damping force generated in the space d1 becomes gradually stronger until fully inserted into the chamber 213'.

An embodiment illustrated in FIG. 9 is different from the above-described embodiment illustrated in FIG. 5 in terms of a shape of the locking portion 233' of the first spring guide 230'.

In an embodiment illustrated in FIG. 9, a size of an outer diameter of a locking portion 233' gradually increases from an upper surface to a lower surface. That is, an outer peripheral surface 233a' of the locking portion 233' is tapered.

Accordingly, when the first spring guide 230' is inserted into the chamber 213, a width of a space d2 between the locking portion 233' and the chamber 213 gradually increases from a lower side of the retainer 210 to an upper side of the retainer 210. Accordingly, as the first spring guide 230' begins to be inserted into the chamber 213, a hydraulic pressure formed in the space d2 between the locking portion 233' and the chamber 213 gradually decreases, and the damping force generated in the space d2 is gradually weakened until fully inserted into the chamber 213.

In embodiments as illustrated in FIGS. 7 to 9, various damping effects may be obtained only by adding the retainer and the first spring guide without major modification of the hydraulic stopping damper.

As such, the hydraulic stopping damper according to the present disclosure includes the shock mitigator, and thus generates the damping force from the shock mitigator when the piston rod performs the rebound stroke as the vehicle passes through bumps and irregularities.

The generated damping force absorbs noise generated when the first spring guide and the rod guide collide with each other as the rebound spring is compressed, thereby preventing noise generation.

In particular, the damping force is generated by the hydraulic force due to the space between the first spring guide and the chamber formed in the rod guide, and since the magnitude of the damping force may be adjusted by adjusting the width of the space, the damping force may be adjusted according to the spring constant of the rebound spring. In addition, the present disclosure may have advantages of capable of adjusting the timing at which the damping force is generated merely by adjusting the depth of the chamber.

Although the embodiments of the present disclosure have been described above with reference to the accompanying drawings, those skilled in the art to which the present disclosure pertains may understand that the present disclosure may be embodied in other specific forms without changing the technical spirit or essential characteristics thereof.

Accordingly, the embodiments described above are to be understood as illustrative and not restrictive in all respects, and the scope of the present disclosure is indicated by the following claims, and from the meaning and scope of the claims and their equivalents. All derived changes or modifications should be construed as being included in the scope of the present disclosure.

REFERENCE NUMERAL

10: cylinder
20: piston rod
30: rod guide
40: rebound spring
100, 100', 100a, 100b, 200, 200', 200a: shock mitigator
110, 110', 110b, 210, 210': chamber
130, 130', 230, 230': first spring guide

What is claimed is:
1. A hydraulic stopping damper comprising:
a cylinder in which a work fluid is stored;
a piston rod coupled such that one side of the piston rod is to be inserted into an inner space of the cylinder;
a rod guide through which the piston rod passes and coupled to one side of the cylinder;
a rebound spring surrounding the piston rod and disposed in an inner space of the cylinder; and
a shock mitigator between the rod guide and the rebound spring, the shock mitigator configured to generate a damping force by a hydraulic pressure of the work fluid when one side of the rebound spring compressed in response to a rebound stroke of the piston rod is inserted into the rod guide,
wherein
the shock mitigator comprises:
    a chamber formed between the shock mitigator and the rod guide; and
    a first spring guide coupled to one side of the rebound spring and including an upper side inserted into the chamber during the rebound stroke of the piston rod,
the rod guide comprises:
    a body portion inserted into the cylinder; and
    a first locking portion extending from an upper surface of the body portion and caught by the cylinder such that the body portion is not inserted past a predetermined length,
the first spring guide comprises:
    an insertion portion inserted into the rebound spring; and
    a second locking portion extending from an upper surface of the insertion portion, formed to have an outer diameter larger than an outer diameter of the insertion portion, and caught by one side of the rebound spring, wherein the second locking portion is inserted into the chamber,
the chamber comprises:
    a first recess formed concavely by a predetermined depth in a direction from a lower surface of the body portion toward an upper surface of the first locking portion; and a second recess formed concavely by a predetermined depth in a direction from the first recess toward the upper surface of the first locking portion, and a width of a first space when the second locking portion is inserted into the first recess is larger than a width of a second space when the second locking portion is inserted into the second recess.

2. A hydraulic stopping damper comprising:
a cylinder in which a work fluid is stored;
a piston rod coupled such that one side of the piston rod is to be inserted into an inner space of the cylinder;
a rod guide through which the piston rod passes and coupled to one side of the cylinder;
a rebound spring surrounding the piston rod and disposed in an inner space of the cylinder; and
a shock mitigator between the rod guide and the rebound spring, the shock mitigator configured to generate a damping force by a hydraulic pressure of the work fluid when one side of the rebound spring compressed in response to a rebound stroke of the piston rod is inserted into the rod guide,
wherein the shock mitigator comprises:
a chamber formed between the shock mitigator and the rod guide; and
a first spring guide coupled to one side of the rebound spring and including an upper side inserted into the chamber during the rebound stroke of the piston rod,
the first spring guide comprises:
an insertion portion inserted into the rebound spring; and
a second locking portion extending from an upper surface of the insertion portion, formed to have an outer diameter larger than an outer diameter of the insertion portion, and caught by one side of the rebound spring, wherein the second locking portion is inserted into the chamber,
an outer diameter of the second locking portion is smaller than an inner diameter of the chamber such that a space is formed between an outer peripheral surface of the second locking portion and an inner peripheral surface of the chamber when the second locking portion is inserted into the chamber, and
an inner surface of the chamber is tapered gradually decreasing from a lower side of the chamber to an upper side of the chamber to guide insertion of the second locking portion.

3. The hydraulic stopping damper of claim 2, wherein the rod guide comprises:
a body portion inserted into the cylinder; and
a first locking portion extending from an upper surface of the body portion and caught by the cylinder such that the body portion is not inserted past a predetermined length.

4. The hydraulic stopping damper of claim 3, wherein the chamber is formed in a recess shape concaved by a predetermined depth in a direction from a lower surface of the body portion toward an upper surface of the first locking portion.

5. The hydraulic stopping damper of claim 2, wherein as the second locking portion is inserted into the chamber, a hydraulic pressure formed in a space between the second locking portion and the chamber gradually increases.

6. A hydraulic stopping damper comprising:
a cylinder in which a work fluid is stored;
a piston rod coupled such that one side of the piston rod is to be inserted into an inner space of the cylinder;
a rod guide through which the piston rod passes and coupled to one side of the cylinder;
a rebound spring surrounding the piston rod and disposed in an inner space of the cylinder; and
a shock mitigator between the rod guide and the rebound spring, the shock mitigator configured to generate a damping force by a hydraulic pressure of the work fluid when one side of the rebound spring compressed in response to a rebound stroke of the piston rod is inserted into the rod guide,
wherein
the shock mitigator comprises:
a chamber formed between the shock mitigator and the rod guide; and
a first spring guide coupled to one side of the rebound spring and including an upper side inserted into the chamber during the rebound stroke of the piston rod,
the first spring guide comprises:
an insertion portion inserted into the rebound spring; and
a second locking portion extending from an upper surface of the insertion portion, formed to have an outer diameter larger than an outer diameter of the insertion portion, and caught by one side of the rebound spring, wherein the second locking portion is inserted into the chamber,
an outer diameter of the second locking portion is smaller than an inner diameter of the chamber such that a space is formed between an outer peripheral surface of the second locking portion and an inner peripheral surface of the chamber when the second locking portion is inserted into the chamber, and
an outer peripheral surface of the second locking portion is tapered such that an outer diameter of the second locking portion gradually increases from the upper side to the lower side.

7. The hydraulic stopping damper of claim 6, wherein as the second locking portion is inserted into the chamber, a hydraulic pressure formed in a space between the second locking portion and the chamber gradually decreases.

8. The hydraulic stopping damper of claim 6, wherein the rod guide comprises:
a body portion inserted into the cylinder; and
a first locking portion extending from an upper surface of the body portion and caught by the cylinder such that the body portion is not inserted past a predetermined length.

9. A hydraulic stopping damper comprising:
a cylinder in which a work fluid is stored;
a piston rod coupled such that one side of the piston rod is to be inserted into an inner space of the cylinder;
a rod guide through which the piston rod passes and coupled to one side of the cylinder;
a rebound spring surrounding the piston rod and disposed in an inner space of the cylinder; and
a shock mitigator between the rod guide and the rebound spring, the shock mitigator configured to generate a damping force by a hydraulic pressure of the work fluid when one side of the rebound spring compressed in response to a rebound stroke of the piston rod is inserted into the rod guide,
the shock mitigator comprises:
a retainer provided on the piston rod to be located in an inner space of the cylinder and connected to a lower portion of the rod guide, wherein a chamber is formed below the retainer; and a first spring guide coupled to one side of the rebound spring and inserted into the chamber during a rebound stroke of the piston rod.

10. The hydraulic stopping damper of claim 9, wherein the retainer comprises:
a body having a cylindrical shape having a hollow through which the piston rod passes,
wherein the chamber is formed in a recess shape concaved by a predetermined depth from a lower surface of the body toward an upper surface of the body.

11. The hydraulic stopping damper of claim 10, wherein the first spring guide comprises:
an insertion portion inserted into the rebound spring; and
a locking portion extending from an upper surface of the insertion portion and formed having an outer diameter larger than an outer diameter of the insertion portion to be caught by one side of the rebound spring, and
the locking portion is inserted into the chamber.

12. The hydraulic stopping damper of claim 11, wherein an inner surface of the chamber is tapered gradually decreasing from a lower side of the chamber to an upper side of the chamber to guide insertion of the locking portion.

13. The hydraulic stopping damper of claim 12, wherein as the locking portion is inserted into the chamber, a hydraulic pressure formed in a space between the locking portion and the chamber gradually increases.

14. The hydraulic stopping damper of claim 11, wherein an outer diameter of the locking portion is formed smaller than an inner diameter of the chamber such that a space is formed between an outer peripheral surface of the locking portion and an inner peripheral surface of the chamber when the locking portion is inserted into the chamber.

15. The hydraulic stopping damper of claim 14, wherein an outer peripheral surface of the locking portion is tapered such that an outer diameter of the locking portion gradually increases from the upper side to the lower side.

16. The hydraulic stopping damper of claim 15, wherein as the locking portion is inserted into the chamber, a hydraulic pressure formed in a space between the locking portion and the chamber gradually decreases.

* * * * *